July 24, 1956
C. J. BOYD
2,755,682
ADJUSTING MECHANISM
Filed Oct. 9, 1953
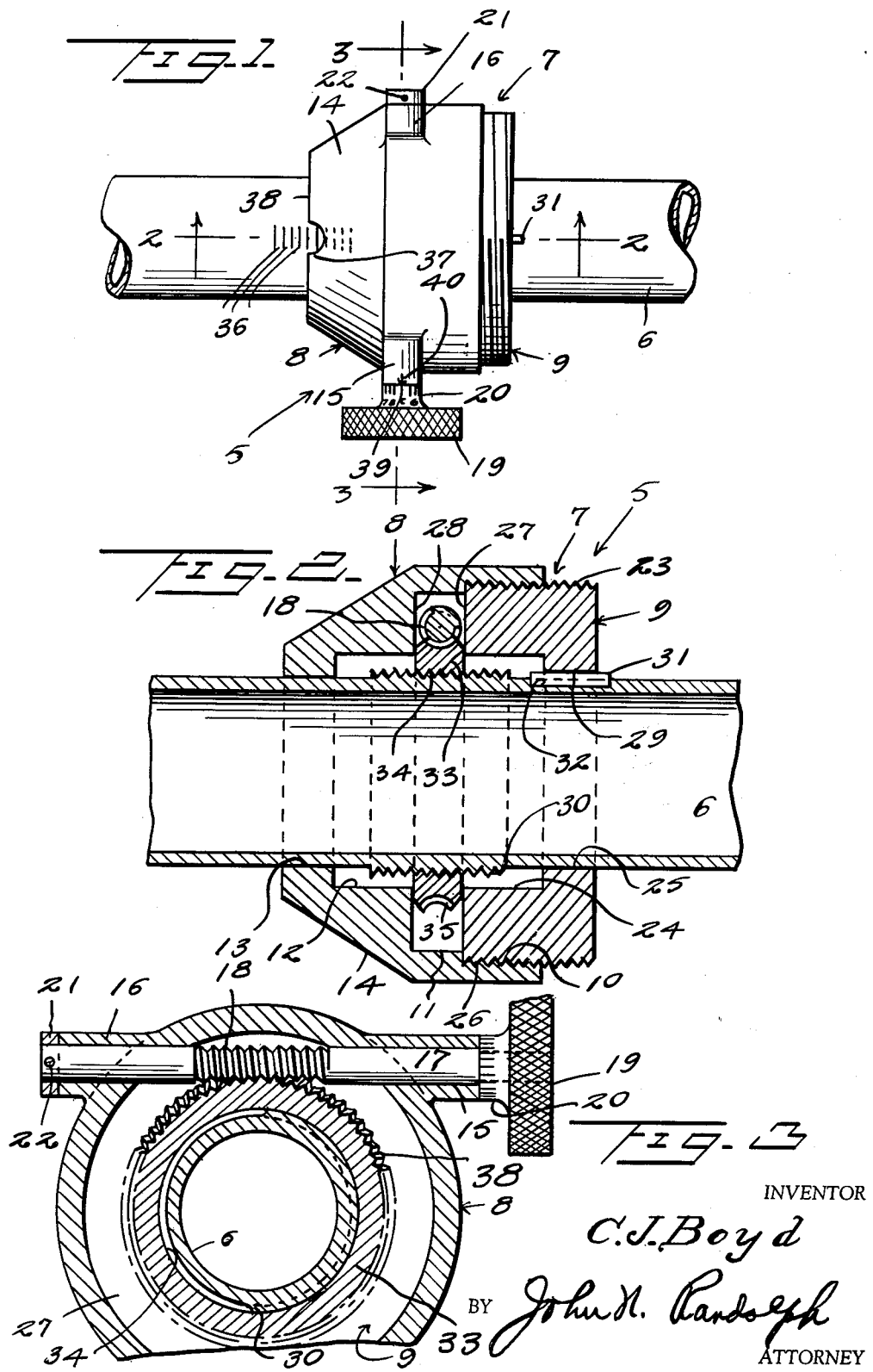
INVENTOR
C. J. Boyd
BY John M. Randolph
ATTORNEY

United States Patent Office 2,755,682
Patented July 24, 1956

2,755,682

ADJUSTING MECHANISM

Charles J. Boyd, Pittsburgh, Pa.

Application October 9, 1953, Serial No. 385,245

4 Claims. (Cl. 74—424.8)

This invention relates to a novel adjusting mechanism for accomplishing fine or critical adjustments of a slidably movable part and while primarily adapted for accomplishing critical adjustments of a drawtube of a refracting telescope, may equally well be utilized for accurately adjusting other slidably movable elements, such as parts of metering devices, valves or the like.

A further object of the invention is to provide an adjusting mechanism of extremely simple construction embodying a minimum number of parts yet which will function with extreme accuracy and efficiency for accomplishing its intended result.

Various other objects and advantages of the invention will hereinafter become more fully apparent from the following description of the drawing, illustrating a presently preferred embodiment thereof, and wherein:

Figure 1 is a top plan view of the adjusting mechanism;

Figure 2 is an enlarged longitudinal sectional view thereof taken substantially along a plane as indicated by the line 2—2 of Figure 1, and Figure 3 is an enlarged fragmentary cross sectional view, taken substantially along a plane as indicated by the line 3—3 of Figure 1.

For the purpose of illustrating a preferred application and use of the adjusting mechanism, designated generally 5 and comprising the invention, a portion of a tube 6 has been illustrated which may be assumed to be a part of a drawtube of a refracting telescope.

The adjusting mechanism 5 includes a housing, designated generally 7, composed of a female section 8 and a male section 9. The female section 8 comprises a nut having a bore extending from end-to-end therethrough composed of longitudinally spaced portions of diminishing diameters from the inner end of said section 8 to its outer end and which includes an internally threaded bore portion 10 which opens outwardly of the inner end of the section 8, and a bore portion 11 of slightly smaller diameter than the threaded bore portion 10, a bore portion 12 of considerably smaller diameter than the bore portion 11, and a bore portion 13 of a smaller diameter than the bore portion 12 and which opens outwardly from the outer end of the section 8. The bore portion 11 is disposed between the bore portions 10 and 12 and is preferably of a length substantially less than the bore portions 10 and 12. The bore portion 12 is of a diameter substantially less than the diameter of the bore portion 11 and is located between the bore portions 11 and 13. The outer half of the female section 8 which surrounds the bore portions 12 and 13 may be externally tapered toward said outer end of the section 8, as seen at 14.

The female housing section 8 is provided with a pair of aligned outwardly opening integral bearings or sleeves 15 and 16 having inner ends which open into the bore portion 11. A shaft 17 extends through and is journaled in the bearings 15 and 16 and has an intermediate portion which is disposed in a part of the bore portion 11 and which is radially spaced from the axis of the housing section 8 a distance greater than the spacing of the wall of the bore portion 12 from the housing axis, as clearly illustrated in Figure 2. Said intermediate portion of the shaft 17 is cut to form a spiral thread of a reduced diameter relatively to the end portions of the shaft 17 and which forms a worm 18, as best illustrated in Figure 3. A knurled thumb and finger knob 19 is formed on one end of the shaft 17 and is provided on one side thereof with a reduced neck portion 20, the outer end of which abuts and turnably engages against the outer end of the bearing 15. A collar 21 is adjustably secured by a suitable fastening 22 to the other end of the shaft 17 and abuts against the outer end of the bearing 16 to cooperate with the neck 20 to prevent sliding movement of the shaft 17 in the bearings 15 and 16.

The male housing section 9 comprises a bushing which is externally threaded as seen at 23 and which is of a diameter to threadedly fit the bore portion 10 and of a length greater than the length of said bore portion 10 so that a part of the section 9 protrudes from the inner end of the section 8, as seen in Figures 1 and 2. The bushing or male section 9 has a central bore extending therethrough including an inner portion 24 of larger diameter than the outwardly opening outer portion 25 thereof. The bore portions 12 and 24 are disposed in alignment and are preferably of the same diameter and length. Likewise, the bore portion 25 is of the same diameter as the bore portion 13 and is disposed in alignment therewith. When the bushing 9 is in a fully applied position its inner end abuts against the annular shoulder 26 of the housing section 8 which is located between the bore portions 10 and 11 and the annular inner end 27 is disposed opposite to the internal annular side wall 28 of the housing section 8, which extends between the bore portions 11 and 12, so that said walls 27 and 28 combine with the bore portion 11 to form an annular inwardly opening channel or groove in which the worm 18 and portions of the shaft 17, located beyond either end of the worm 18, are turnably disposed. The bore portion 25 is provided with an inwardly opening groove or channel 29 extending from end-to-end thereof and forming a keyway.

The exterior of the tube 6 is modified to the extent that it is provided with an externally thickened threaded portion 30 of a length substantially less than the combined lengths of the housing portions 11, 12 and 24 and which fits loosely therein. A feather key or spline 31 is secured in and projects outwardly from a groove 32 formed in the tube 6. The feathered key 31 is disposed beyond and adjacent one end of the threaded portion 30 and extends longitudinally of the tube 6.

An annular worm wheel 33 has a threaded bore 34 which threadedly engages the threaded tube portion 30 and a grooved, toothed periphery 35 which meshes with the worm 18. The worm wheel 33 is of a width to turnably and non-slidably fit between portions of the annular walls 27 and 28 with its outer portion disposed in the annular channel formed by said walls and by the bore portion 11, so that the worm wheel 33 is rotatably and non-slidably disposed in the housing 7.

From the foregoing it will be readily apparent that the adjusting mechanism 5 may be readily assembled by first positioning the worm wheel 33 in meshing engagement with the worm 18 and thereafter inserting the tube 6 from right to left into the housing section 8 and through the bore of the worm wheel 33 until the threaded portion 30 engages the threaded worm wheel bore 34. The threaded portion 30 is then threaded partially through the bore 34 by turning the tube 6 relatively to the worm wheel 33 and housing section 8. The male housing section 9 is then applied over the right-hand end of the tube 6 and threaded into the bore portion 10. After the feather key 31 engages the groove 29, completing of the threaded connection of the parts 23 and 10 is accomplished with the tube 6 being turned with the housing section 9.

It will be understood that the housing 7 may be secured in a fixed position in any suitable manner. By manually turning the thumb knob 19 in one direction, the worm wheel 33 will be revolved and as said worm wheel is held against longitudinal movement within the housing 7, as previously described, rotation of said wheel will cause the tube 6 to be moved longitudinally through the housing 7 due to the threaded connection 30, 34 between the tube and worm wheel and the feather key 31 which prevents rotation of the tube 6 in the housing 7. The worm 18 and knob 19 must be revolved a plurality of times to accomplish one complete revolution of the worm wheel 33 so that very accurate and critical adjustment of the tube 6 may be accomplished.

If desired, an upper portion of the tube 6 may be provided with longitudinally spaced graduations 36 and the tapered housing end 14 may be provided with an arcuate notch 37 disposed in alignment with the graduations 36 so that the outer end or edge 38 of the housing section 8 will provide an interrupted index line for cooperation with the graduations 36. Likewise, the periphery of the neck 20 may be provided with circumferentially spaced numbered graduations 39 functioning with an index line or point 40 on the upper side of the bearing 15 and which graduations 39 have a definite relationship to the graduations 36 for accomplishing accurate adjustment of the tube 6 relatively to the housing 7.

For most purposes for which the mechanism 5 is intended, only very slight movements of the tube 6 will be required and where extreme accuracy is necessary, so that manually operation of the mechanism by the knob 19 will be very efficient and satisfactory. For other purposes where greater movement of the tube 6 will be required, a suitable reversing motor, not shown, may be utilized for revolving the shaft 17 in either direction, controlled by push button switches.

Obviously, the adjusting mechanism 5 may be made in various sizes and the member 6 may be in the form of a rod rather than a tube and need not necessarily be of circular cross section.

Various other modifications and changes are likewise contemplated and may be resorted to, without departing from the spirit or scope of the invention as hereinafter defined by the appended claims.

I claim as my invention:

1. An adjusting mechanism comprising an elongated housing having a bore extending longitudinally therethrough, an elongated member extending slidably through said bore, means keying said elongated member to the housing to prevent rotation of said member relatively to the housing, a shaft extending transversely through a portion of the housing between a portion of the periphery thereof and an adjacent portion of said elongated member, and a worm gear connecting said elongated member and shaft whereby rotation of the shaft will cause longitudinal movement of said elongated member relatively to the housing, said bore including an enlarged intermediate portion containing said worm gear and an intermediate portion of said shaft, said housing being formed of detachably connected end sections having longitudinally spaced annular wall portions defining an annular inwardly opening channel through which said shaft extends and in which said worm gear is rotatably confined against movement longitudinally of the housing.

2. An adjusting mechanism as in claim 1, said worm gear comprising an annular worm wheel rotatably disposed between said annular housing walls and around said elongated member, means threadedly connecting said worm wheel to said elongated member, said shaft having an intermediate portion forming a worm, and said worm wheel having a toothed periphery meshing with said worm.

3. An adjusting mechanism as in claim 2, said housing including a female section having an internally threaded inner end and an externally threaded male section threadedly engaging in said internally threaded female section end.

4. An adjusting mechanism as in claim 3, said housing sections having aligned bore portions at remote ends thereof through which portions of the elongated member slidably extend and have close fitting working engagement, said bore portions being of smaller cross sectional size than the remainder of the hollow interior of said housing, and said elongated member having an externally threaded part of larger cross sectional size than said bore portions and disposed therebetween and extending threadedly through the worm gear.

References Cited in the file of this patent

UNITED STATES PATENTS

| | | |
|---|---|---|
| 968,358 | Jacobson | Aug. 23, 1910 |
| 1,463,899 | McKechnie | Aug. 7, 1923 |